UNITED STATES PATENT OFFICE.

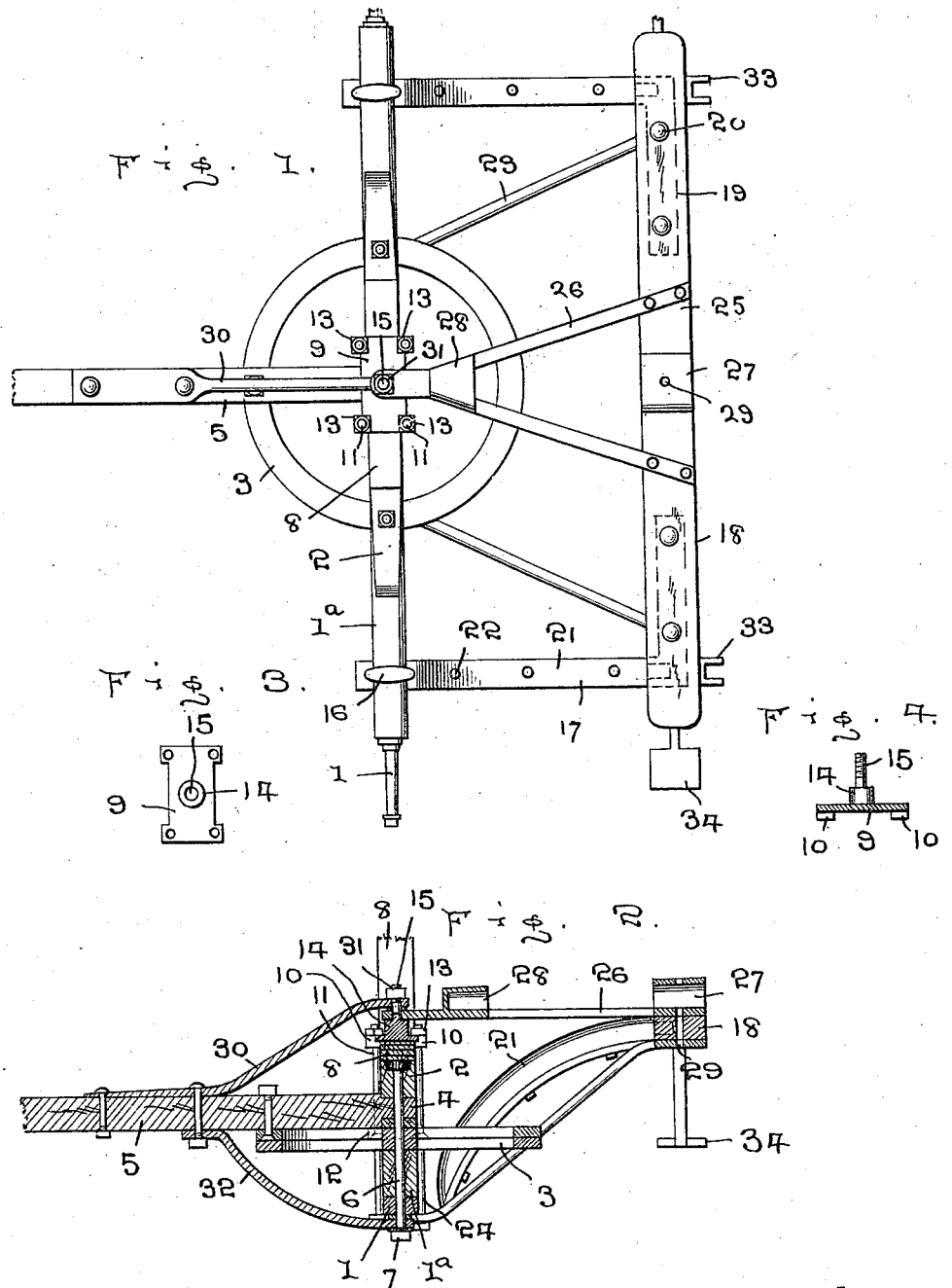

ROBERT GRUBE, OF EGG HARBOR CITY, NEW JERSEY.

ATTACHMENT FOR RUNNING-GEARS OF VEHICLES.

966,327.

Specification of Letters Patent. Patented Aug. 2, 1910.

Application filed April 12, 1910. Serial No. 555,062.

*To all whom it may concern:*

Be it known that I, ROBERT GRUBE, a citizen of the United States, residing at Egg Harbor City, in the county of Atlantic and State of New Jersey, have invented certain new and useful Improvements in Attachments for Running-Gears of Vehicles; and I do hereby declare the following to be a full, clear, and exact description of the invention, such as will enable others skilled in the art to which it appertains to make and use the same.

My invention relates to new and useful improvements in attachments for running gears of vehicles and my object is to provide a coupling bar for receiving the shafts of the vehicle.

A further object is to provide means for attaching the coupling bar to the running gear of the vehicle.

A further object is to provide means for securely bracing the coupling bar to resist the strain occasioned by the forward or rearward action of the shafts upon the coupling bar, and, a further object is to provide means for attaching a pole to the parts of the vehicle.

Other objects and advantages will be hereinafter referred to and more particularly pointed out in the specification and claims.

In the accompanying drawings which are made a part of this application, Figure 1 is a top plan view of the forward portion of a running gear showing my improved attachments applied thereto. Fig. 2 is a central sectional view through the running gear. Fig. 3 is a top plan view of a plate showing the stud thereon to receive the brace bar of the coupling bar, and, Fig. 4 is a longitudinal central sectional view through said plate.

Referring to the drawings in which similar reference numerals designate corresponding parts throughout the several views, 1 indicates the forward axle of a vehicle upon which is mounted an axle bed 1ª and above the axle bed is placed a head block 2, said head block being constructed in the usual or any preferred manner and has attached thereto the upper half of a fifth wheel 3, the lower half of the fifth wheel being secured to the axle 1 and bed 1ª in any preferred manner.

Extending through the head block 2 is the mortised end 4 of a reach bar 5, said reach bar being fixed to the block by introducing a bolt 6 downwardly through the block, the end 4 of the reach bar and the axle 1, the lower end of the bolt being engaged by a nut 7 to hold said bolt in position.

Positioned above the head block 2 and resting thereon is a spring 8, which spring is secured in position on the block by placing over the central portion thereof a plate 9, each end of the plate being provided with depending lugs 10, which project on opposite sides of the spring when properly positioned thereon and through said lugs are introduced bolts 11, the lower ends of the bolts extending through straps 12 below the block, while the upper ends thereof are engaged by nuts 13, whereby the plate may be securely clamped on to the spring and the spring on to the block.

Extending upwardly from the central portion of the plate 9 is a stud 14 and from the central portion of said stud extends upwardly a pin 15, said pin being of less diameter than the stud, whereby a shoulder will be formed at the intersection of the stud with the pin.

Secured to the axle 1 adjacent its ends by means of clips 16 are braces 17, which braces are curved upwardly and outwardly and have engaged with their outer ends a coupling bar 18, which bar extends parallel with the axle and transversely of said braces, the ends of the braces engaging the bar 18 having inwardly directed extensions 19 thereon, through which and the coupling bar are introduced bolts 20 and by means of which the coupling bar is secured to said braces.

The braces 17 are preferably covered with bent sections of wood 21, the upper ends of which are preferably mortised into the coupling bar 18 adjacent its ends, while the bent sections are secured to the brace bar 17 by means of bolts 22. The coupling bar 18 is further strengthened by means of brace rods 23, the forward ends of which are attached to one of the bolts 20, while the rear ends thereof are attached to one of the bolts 24 employed for securing the lower section of the fifth wheel to the axle, said brace rods extending at an angle to the trend of the braces.

Attached to the central portion of the coupling bar 18 is a plate 25, said plate having rearwardly extending arms 26 connected thereto, which converge at their inner ends and extend over the pin 15 of the stud 14 and rest upon the shoulder at the upper end of the stud.

At the longitudinal center of the plate 25 is formed a loop 27, through which is adapted to be extended a pole, (not shown), as when the vehicle is being drawn by a double team, while at the convergence of the arms 26 is provided a socket 28, into which the inner end of the pole is to be introduced, the pole being held in engagement with the coupling bar 18 by introducing any suitable form of securing device through the openings 29 in the coupling bar.

To relieve the strain upon the pin 15, as when the vehicle is being moved rearwardly or a heavy load is being drawn, a brace strap 30 is attached to the reach bar 5 and its outer end engaged with the upper end of the pin 15, a nut 31 being engaged with the threaded end of the pin 15 to hold the brace strap and the end of the brace arms 26 in engagement with the pin. A similar brace strap 32 is extended from the lower end of the bolt 6 to the reach bar 5, one of the bolts employed for holding the strap in engagement with the reach bar being also employed for holding the strap in engagement therewith.

The coupling bar 18 is provided with thill couplings 33 to which the shafts are to be attached and at the ends of the bar 18 may be placed the usual or any preferred form of steps 34.

It will thus be seen that I have provided a very strong and durable means for attaching the shafts or pole to the front axle of the vehicle and it will likewise be seen that by attaching the spring to the bolster in the manner shown, said spring will be securely held in position and as no bolts extend through the spring, the strength thereof will be enhanced.

It will further be seen that by providing the stud on the plate employed for holding the spring in position and attaching thereto the brace bars, as shown the coupling bar will be securely braced and the major portion of the strain relieved from the pin on the stud and it will likewise be seen that by providing the depending lugs on the plate, which extend at opposite sides of the spring, said spring will be securely held against twisting movement.

What I claim is:—

1. The combination with an axle, a head block above said axle, a two-part fifth wheel between the block and axle, means to secure the parts of the fifth wheel respectively to the axle and block, a reach bar and means to pivotally connect the block and reach bar to the axle, of a spring positioned above said head block, a securing plate, means engaging said securing plate and head block to clamp the spring in position on the head block, said plate having a stud projecting therefrom and a pin projecting from the stud, a coupling bar, means to connect the coupling bar to the axle and said pin and additional means to brace the upper end of said pin.

2. The combination with a head block of a vehicle and a spring mounted upon said block, of a plate fitting over said spring and having depending lugs thereon to engage the faces of the spring, bolts extending through said plate adapted to clamp the plate and spring upon the head block, said plate having an upwardly extending stud and a pin extending from said stud, a coupling bar, brace bars extending from said coupling bar and engaging said pin and a brace strap engaging said pin above the brace bars adapted to relieve strain on said pin.

3. The combination with a vehicle axle, a head block, a spring on said block and a securing plate for the spring, of a coupling bar, a plate on said bar, a brace bar extending from said coupling bar and having its inner end engaged with the securing plate of the spring, said plate having a loop at its center, the brace bar having a socket, said loop and socket being adapted to receive the end of a pole.

4. A vehicle construction, comprising the combination with a swinging axle, a head block, a spring on the block and a plate adapted to secure the spring on the block, of a coupling bar, braces extending from the axle and engaging said coupling bar adjacent its ends, brace rods also engaging said axle and coupling bar, said brace rods being extended at an angle to the first set of braces and a brace bar having one of its ends attached to the coupling bar and its opposite end engaged with the spring securing plate.

5. In a vehicle construction, the combination with a head block and a spring thereon, of a plate adapted to rest on said spring, lugs depending from said plate engaging the sides of the spring, bolts extending from the bolster and through said plate, whereby the spring may be clamped in engagement with the bolster, said plate having an integral stud extending upwardly therefrom and an integral pin extending upwardly from the stud, said pin being of less diameter than the stud to form a shoulder.

In testimony whereof I have signed my name to this specification in the presence of two subscribing witnesses.

ROBERT GRUBE.

Witnesses:
CONRAD LEHNIES,
WILLIAM ZIMMER.